United States Patent

[11] 3,557,951

[72] Inventor Boris Knisch
 P.O. Box 77, Estelle Manor, N.J. 08319
[21] Appl. No. 762,275
[22] Filed Sept. 16, 1968
[45] Patented Jan. 26, 1971

[54] SCALE GRADING MEANS
 17 Claims, 4 Drawing Figs.
[52] U.S. Cl. .................................................. 209/121,
 177/59, 177/145
[51] Int. Cl. .................................................. B07c 5/24
[50] Field of Search .......................................... 177/59,
 145, 185, (Magnets Digest); 209/74, 121

[56] References Cited
 UNITED STATES PATENTS
3,152,655 10/1964 Allen ......................... 209/121X
3,276,582 10/1966 Laughlin ..................... 209/121

Primary Examiner—Richard A. Schacher
Attorney—Jacob Trachtman

ABSTRACT: A scale-grading means for grading articles such as eggs according to weight comprising a conveyor continuously movable in a closed path and passing a plurality of grading stations, the conveyor carrying a plurality of article weighers, each article weigher including a cradle which supports an article and an ejector which is adapted to eject the article from the cradle. Each of the grading stations includes magnetic means which operates the ejector of the cradle depending on the weight of the article in the cradle, the magnetic means at each station causing the ejection of an article of different weight so that articles of substantially the same weight are ejected at the same station thereby grading the articles according to weight.

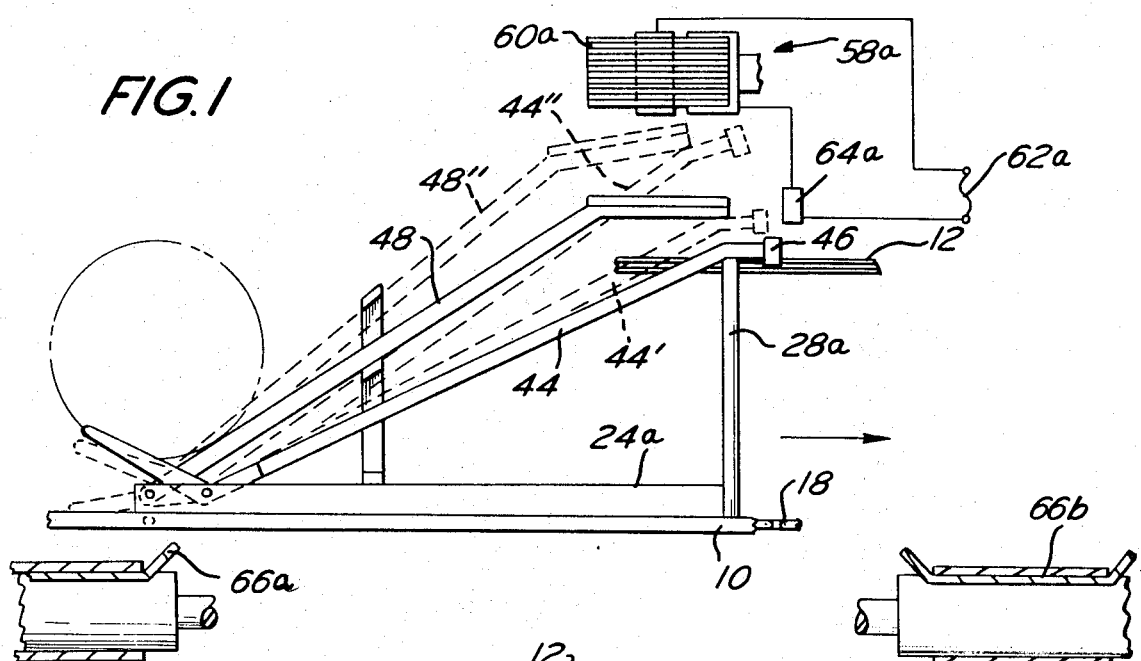
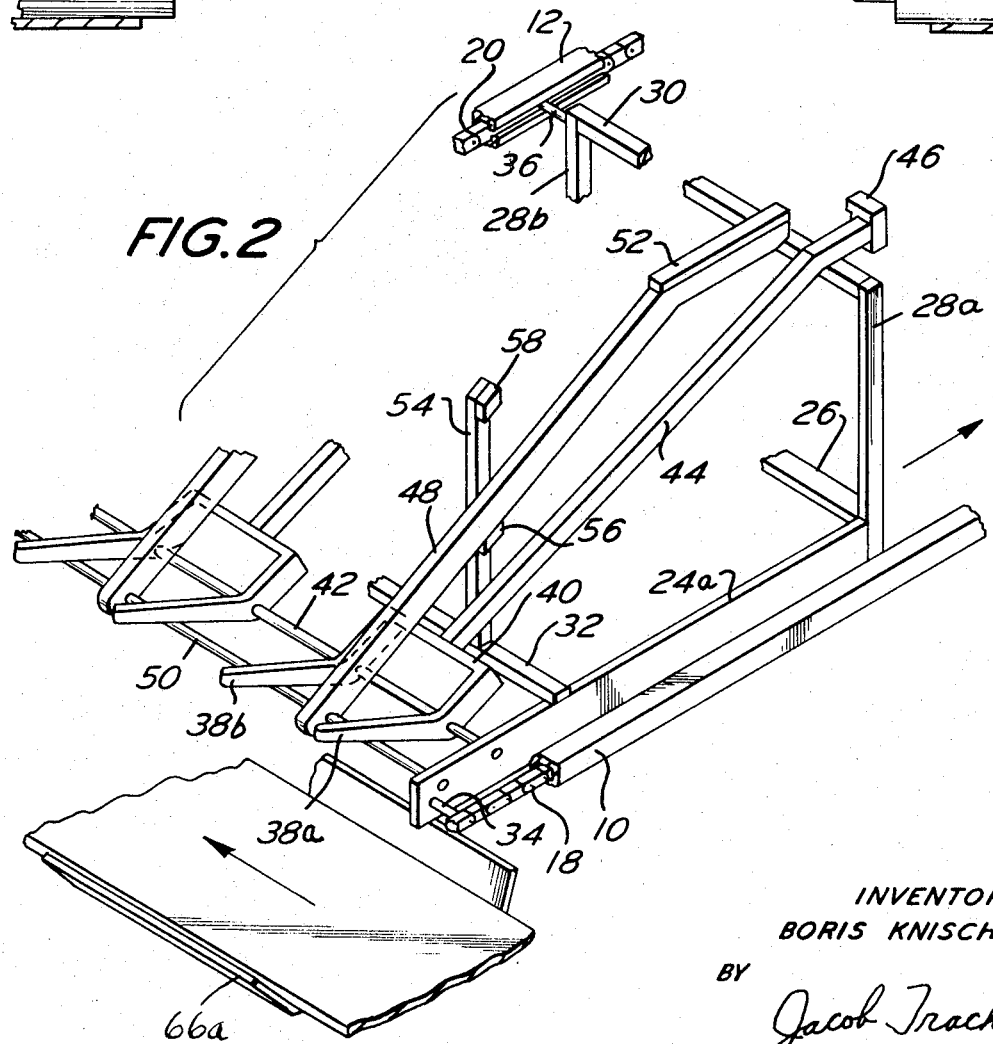

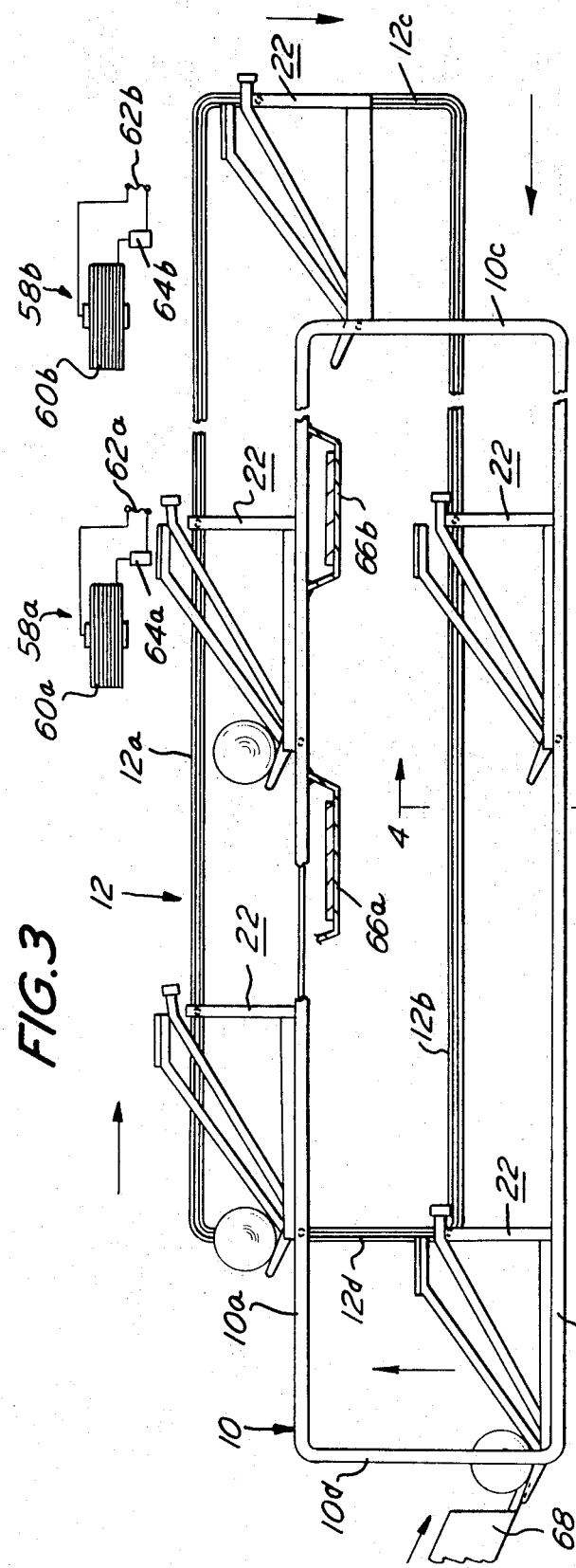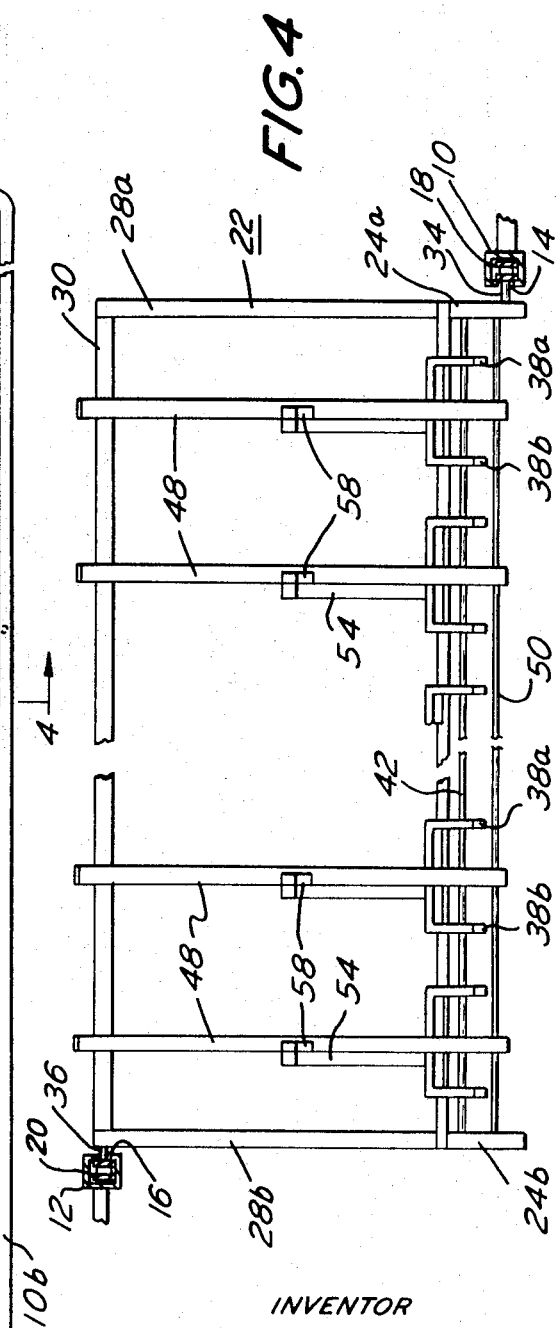

SCALE GRADING MEANS

The present invention relates to a machine for grading articles such as eggs according to weight.

In the packaging of articles such as eggs for sale, it is necessary to grade such articles according to weight or size. Since eggs of different sizes are of different weight, it is possible to accurately grade the eggs according to size by weighing the eggs. However, for a mass production operation, to manually weigh the eggs is a time consuming and expensive operation. Therefore, it is an object of the present invention to provide an article grader which grades the articles such as eggs according to weight by an automatic, continuous operation.

The scale-grading means of the present invention particularly described with regard to the grading of eggs but not limited thereto includes a continuously moving conveyor which moves in a closed path passing a loading station and a plurality of grading stations. The conveyor carries a plurality of supports mounted in spaced relation along the conveyor. Each support has a plurality of scales or egg weighers mounted thereon in side-by-side, spaced relation. Each scale or egg weigher includes a cradle for supporting an egg, and a pivoted ejector arm which is adapted to eject the egg from the cradle. Each of the grading stations includes a magnetic means for operating the ejector of the cradles according to the weight of egg to be collected at the station, and a conveyor for carrying away the ejected eggs. The magnetic means at each station is of a different strength so that each ejects eggs of different weights. Thus, as the cradles are carried past a station, eggs of the same weight are ejected with eggs of different weights being ejected at different stations. Thus, the eggs are automatically graded according to weight.

For the purpose of illustrating the invention there is shown in the drawings a form which is presently preferred; it being understood, however, that this invention is not limited to the precise arrangements and instrumentalities shown.

FIG. 1 is a side view of a support and an egg weigher thereon at one of the grader stations of a scale-grading means of the invention.

FIG. 2 is a perspective view of the support of FIG. 1 and a plurality of egg weighers thereon.

FIG. 3 is a side view of the conveyor of the scale-grading means with the egg weigher supports shown in FIG. 2 mounted thereon.

FIG. 4 is a sectional view taken along line 4–4 of FIG. 3.

Referring initially to FIG. 3, the conveyor of the present invention includes a pair of substantially rectangular guide rails 10 and 12 arranged in spaced, parallel relation. The guide rail 10 has a pair of horizontally extending portions 10a and 10b connected together by a pair of vertically extending portions 10c and 10d, and the guide rail 12 likewise has a pair of horizontally extending portions 12a and 12b connected together by a pair of vertically extending portions 12c and 12d. The guide rail 12 is positioned so that its horizontally extending portions 12a and 12b are vertically above the corresponding horizontally extending portions 10a and 10b of the guide rail 10, and the vertically extending portions 12c and 12d of the guide rail 12 are horizontally spaced from the corresponding vertically extending portions 10c and 10d of the guide rail 10. The guide rails 10 and 12 are formed of tubular members having slots 14 and 16 respectively in the sides facing the other rail. Conveyor chains 18 and 20 are slidably supported in the guide rails 10 and 12 respectively. The conveyor chains 18 and 20 are driven by any suitable drive means, not shown, so that the chains both move at the same speed.

A plurality of identical supports, generally designated as 22, are mounted in spaced relation between the guide rails 10 and 12, and are supported on the conveyor chains 18 and 20 for movement along the path of the guide rails. As shown in FIGS. 2 and 4, each of the supports 22 comprises a pair of horizontally extending side rails 24a and 24b connected together in spaced, parallel relation at their back ends by a back rail 26. A pair of upright posts 28a and 28b are secured to and extend vertically upward from the back ends of the side rails 24a and 24b respectively. A top rail 30 is connected between the top ends of the posts 28a and 28b. A support rail 32 is connected between the side rails 24a and 24b at a point spaced from the front ends of the side rails. Each support 22 is supported on the conveyor chain 18 by a pin 34 extending from the side rail 24a at the front end thereof, and pivotally connected to the conveyor chain 18. The support 22 is supported on the conveyor chain 20 by a pin 36 extending from the upright post 28b at the top end thereof, and pivotally connected to the conveyor chain 20.

Each of the supports 22 carries a plurality of egg weighers mounted in spaced-apart, side-by-side relation between the side rails 24a and 24b of the support. As shown in FIG. 2, each egg weigher includes a cradle formed by a pair of substantially V-shaped arms 38a and 38b connected together in spaced-apart, parallel relation by a base 40 extending between the back ends of the arms. The arms 38a and 38b are pivotally mounted on a rod 42 which extends through the apex of each arm with the ends of the arms extending upwardly from the rod 42. The rod 42 is secured between the side rails 24a and 24b of the support 22 between the support rail 32 and the front ends of the side rails. A switch-operating arm 44 is secured to and extends from the middle of the base 40. The switch-operating arm 44 extends upwardly to the top rail 30 of the support 22 with the end of the switch operating arm extending horizontally over the top rail 30. A permanent magnet 46 is secured to the end of the switch-operating arm 44.

An ejector arm 48 is mounted between the cradle arms 38a and 38b. The front end of the ejector arm 48 is pivotally mounted on a rod 50. The rod 50 is secured between the side rails 24a and 24b adjacent the front ends of the side rails. The ejector arm 48 extends upwardly toward the top rail 30. The back end of the ejector arm extends substantially horizontally to the top rail 30. A plate 52 of a magnetic metal is secured to the top surface of the back end of the ejector arm 48. An upright post 54 is mounted on the support rail 32 of the support 22 adjacent the ejector rail 48. A lower stop ledge 56 extends from the post 54 beneath the ejector arm 48. The stop ledge 56 is at a level to support the ejector arm 48 at a position in which the back end of the ejector arm extends horizontally. An upper stop ledge 58 extends from the upper end of the post 54 over the ejector arm 48.

A plurality of grading stations are mounted in spaced relation along and over the upper horizontally extending portions 10a and 12a of the conveyor rails 10 and 12. Although only two grading stations 58a and 58b are shown in FIG. 3, it should be understood that any number of stations can be provided depending on the number of different sizes that the eggs are to be graded into. Each of the grading stations 58a and 58b comprises an electromagnet 60a and 60b electrically connected to a source of electrical current 62a and 62b through a magnetically operated switch 64a and 64b. The electromagnets 60a and 60b are mounted directly over the path of travel of the ejector arms 48 of the egg weighers, and are positioned vertically spaced above the horizontal position of the metal plate 52 on the back end of the ejector arm. The electromagnets 60a and 60b are of different magnetic strengths with the first electromagnet 60a being the weakest and the last electromagnet 60b being the strongest. The electromagnets of any grader station in between the first and last are of incrementally increasing strengths. Although in FIG. 3 there is shown only one electromagnet at each grading station, it must be understood that each grader station includes a plurality of electromagnets in side-by-side relation across the width of the supports 22. The number of electromagnets at each station is equal to the number of egg weighers on the supports 22. Although all of the electromagnets at each station can be connected to the same source of electric current, each electromagnet has its own switch. Each grader station also includes a conveyor belt 66a and 66b extending horizontally beneath and perpendicularly to the upper portion 10a of the guide rail 10. An egg delivery chute 68 extends to the front portion 10d of the guide rail 10.

In the operation of the scale-grading means of the present invention exemplified by the egg grader, the supports 22 are continuously moved by the conveyor chains 18 and 20 along the closed path of the guide rails 10 and 12 in the direction indicated by the arrows in FIG. 3. The arrangement of the guide rails 10 and 12, and the manner that the supports 22 are mounted on the conveyor chains 18 and 20 maintains the supports in an upright position throughout the complete travel of the supports along the guide rails as shown in FIG. 3.

When there is no egg on the cradle of an egg weigher, the back end of the switch-operating arm 44 rests on the top rail 30 of the support 22, and the ejector arm 48 rests on the lower stop ledge 56 as indicated in full lines in FIG. 1. When the support 22 reaches the forward vertical portions 10d and 12d of the guide rails 10 and 12, an egg is fed from the delivery chute 68 onto the cradle arms 38a and 38b of each of the egg weighers on the support 22. As the egg rolls onto the forward ends of the cradle arms 38a and 38b, the weight of the egg causes the cradle arms to pivot slightly as the egg is supported between the cradle arms and the ejector arm 48. This pivoting of the cradle arms 38a and 38b lifts the switch-operating arm 44 upwardly slightly until it contacts the end of the ejector arm 48 which acts as a stop to assume the dashed line position 44' shown in FIG. 1.

The support 22 with an egg in each of the egg weighers then passes to the first grader station 58a. When the support 22 reaches the first grader station 58a, the magnet 46 on each of the switch-operating arms 44 which has been raised is in a position to magnetically actuate a switch 64a to its on position, and thereby respectively actuate each of the electromagnets 60a. Each of the actuated electromagnets 60a creates a magnetic force which tends to attract the metal plate 52 on the back end of an ejector arm 48. If the magnetic force applied to the metal plate 52 is greater than the force applied to the ejector arm 48 by the weight of the egg resting on the ejector arm, the metal plate 52 will be pulled upwardly to the electromagnet 60a. This will pivot the ejector arm 48 upwardly to the dashed line position 48" shown in FIG. 1. This upward movement of the ejector arm 48 is limited by the ejector arm engaging the upper stop ledge 58. As the ejector arm 48 pivots upwardly, it pushes the egg toward the front ends of the cradle arms 38a and 38b. The shifting of the weight of the egg causes the cradle arms 38a and 38b to pivot so that the forward ends of the cradle arms move downwardly and the switch operating arm 44 lifts upwardly to the dashed line position 44" shown in FIG. 1. This pivoting of the cradle arms 38a and 38b allows the egg to roll off of the cradle arms and onto the conveyor belt 66a which carries the egg to a packaging station.

If the magnetic force of the electromagnet 60a is not greater than the force applied to the ejector arm 48 by the weight of the egg, the ejector arm is prevented from being pulled upwardly so that the egg remains on the cradle arms 38a and 38b. The support 22 then passes to the next grader station where the magnetic force of the electromagnet is greater than that of the electromagnet of the first station. If the magnetic force of the electromagnet of the second grader station is greater than the force applied to the ejector arm 48 by the weight of the egg, the ejector arm is actuated to eject the egg from the cradle. If the egg is not ejected at the second station, it passes from station to station until it reaches a station where the magnetic force of the electromagnet is great enough to eject the egg. Thus, at the first grader station the smallest eggs, which are the lightest in weight, are ejected. At each of the next consecutive grader stations eggs of incrementally larger size are ejected until the largest eggs are ejected at the last station.

When the ejector arm 48 is actuated so as to cause the pivoting of the cradle arms and the lifting of the switch operation arm 44, the magnet 46 is moved away from the switch. This actuates the switch to its off position so as to turn off the electromagnet. This allows the ejector arm 48 to drop back onto the lower stop ledge 56, and the switch-operating arm 44 to drop back onto the top rail 30 of the support 22. When the empty egg weigher passes the next grader station, the magnet 46 is below the switch of the station so that the switch is not actuated to turn on the electromagnet. Thus, the ejector arms of the empty egg weighers are not actuated each time they pass a grader station.

Thus, with the egg grader of the present invention, the eggs are continuously carried past a series of grader stations with the eggs being ejected at a station according to the size of the egg. At each of the grader stations eggs of the same size are ejected and carried away by a conveyor belt to be packaged. The size of the eggs which will be ejected at each of the grader stations can be adjusted by adjusting the magnetic force of the electromagnet. Thus, the egg grader of the present invention can be easily adjusted to separate the eggs into any desired number of grades.

The present invention may be embodied in other specific forms without departing from the spirit or essential attributes thereof and, accordingly, reference should be made to the appended claims, rather than to the foregoing specification as indicating the scope of the invention.

I claim:

1. A scale-grading means comprising a support, an article weigher mounted on said support, said weigher including a cradle adapted to hold an article therein and an ejector extending across said cradle for ejecting an article from the cradle, means for moving said support past a plurality of grader stations, and means at each of said grader stations for actuating said ejector so as to eject the article from the cradle depending on the weight of the article, the ejector actuating means at each grader station ejecting articles of different weights.

2. A scale-grading means comprising a support, an article weigher mounted on said support, said weigher including a cradle adapted to hold an article therein and an ejector adapted to eject an article from the cradle, means for moving said support past a plurality of grader stations, and means at each of said grader stations for actuating said ejector so as to eject the article from the cradle depending on the weight of the article, the ejector actuating means at each grader station ejecting articles of different weights, the ejector-actuating means at each station being an electromagnet which actuates the ejector if the magnetic force created by the electromagnet is greater than the force applied to the ejector by the weight of the article, the electromagnets at the various stations providing magnetic forces of different magnitudes.

3. The means in accordance with claim 2 in which the ejector is an arm pivotally mounted at one end of the support and extending across the cradle, and a piece of magnetic metal is secured to the other end of the arm, said metal piece being adapted to be attracted by the magnetic force of the electromagnet at a grader station so as to pivot the arm and eject an article from the cradle.

4. The means in accordance with claim 3 in which the cradle comprises a pair of V-shaped arms connected together in spaced parallel relation, said cradle arms being pivotally mounted on the support at the apexes of the arms with the arms extending upwardly, and the ejector arm extends between and parallel to the cradle arms, the cradle supports an article with the article being seated across the cradle arms and against the ejector arm.

5. The means in accordance with claim 4 including means mounted on said support and limiting the pivotal movement of the ejector arm.

6. The means in accordance with claim 4 in which each of the grader stations includes a switch for actuating the electromagnet, and the cradle has a switch-operating arm extending therefrom and means on the switch-operating arm to actuate the switch as the support reaches the grader station.

7. The means in accordance with claim 6 in which the means for moving the support comprises a continuously moving conveyor extending in a closed path, and a plurality of supports are mounted in spaced relation along the conveyor.

8. The means in accordance with claim 7 in which each support has a plurality of article weighers mounted thereon in spaced sideyby-side relation.

9. The means in accordance with claim 8 in which each grader station has a plurality of electromagnets equal in number to the number of article weighers on a support, and each electromagnet has a separate magnetically actuated switch.

10. A scale-grading means comprising a support, an article weigher mounted on said support, said weigher including a cradle adapted to hold an article therein and an ejector extending across said cradle for ejecting an article from the cradle, and means for actuating said ejector so as to eject the article from the cradle depending on the weight of the article.

11. A scale-grading means comprising a support, an article weigher mounted on said support, said weigher including a cradle adapted to hold an article therein and an ejector adapted to eject an article from the cradle, and means for actuating said ejector so as to eject the article from the cradle depending on the weight of the article, the ejector-actuating means being an electromagnet which actuates the ejector if the magnetic force created by the electromagnet is greater than the force applied to the ejector by the weight of the article.

12. The means in accordance with claim 11 in which the ejector is an arm pivotally mounted at one end of the support and extending across the cradle, and a piece of magnetic metal is secured to the other end of the arm, said metal piece being adapted to be attracted by the magnetic force of the electromagnet to pivot the arm and eject an article from the cradle.

13. The means in accordance with claim 12 in which the cradle comprises a pair of V-shaped arms connected together in spaced parallel relation, said cradle arms being pivotally mounted on the support at the apexes of the arms with the arms extending upwardly, and the ejector arm extends between and parallel to the cradle arms, the cradle supports an article with the article being seated across the cradle arms and against the ejector arm.

14. The means in accordance with claim 13 including means mounted on said support and limiting the pivotal movement of the ejector arm.

15. The means in accordance with claim 13 in which said electromagnet has a switch for actuating the electromagnet, and the cradle has a switch-operating arm extending therefrom and means on the switch-operating arm to actuate the switch.

16. The means in accordance with claim 15 in which each support has a plurality of article weighers mounted thereon in spaced side-by-side relation.

17. The means in accordance with claim 16 including a plurality of electromagnets equal in number to the number of article weighers on a support, and in which each electromagnet has a separate magnetically actuated switch.